United States Patent
Miya

(10) Patent No.: US 7,199,691 B2
(45) Date of Patent: Apr. 3, 2007

(54) FLAT RESOLVER

(75) Inventor: Taiichi Miya, Tokyo (JP)

(73) Assignee: Minebea Co., Ltd., Kitasaku-gun (JP)

( * ) Notice: Subject to any disclaimer, the term of this patent is extended or adjusted under 35 U.S.C. 154(b) by 0 days.

(21) Appl. No.: 11/261,787

(22) Filed: Oct. 31, 2005

(65) Prior Publication Data

US 2006/0125588 A1  Jun. 15, 2006

(30) Foreign Application Priority Data

Dec. 10, 2004 (JP) ............... 2004-358929

(51) Int. Cl.
*H01F 21/06* (2006.01)
(52) U.S. Cl. ............... 336/120; 73/862.191
(58) Field of Classification Search .......... 336/120
See application file for complete search history.

(56) References Cited

U.S. PATENT DOCUMENTS

2003/0056606 A1* 3/2003 Matsuura et al. ...... 73/862.191

FOREIGN PATENT DOCUMENTS

| JP | 5-10779 | 1/1993 |
|---|---|---|
| JP | 05299254 A * | 11/1993 |
| JP | 07-211537 | 8/1995 |
| JP | 08-084449 | 2/1996 |
| JP | 5-136211 | 5/1996 |
| JP | 08136211 A * | 5/1996 |
| JP | 08-292066 | 11/1996 |

* cited by examiner

*Primary Examiner*—Elvin Enad
*Assistant Examiner*—Joselito Baisa
(74) *Attorney, Agent, or Firm*—Foley & Lardner LLP

(57) ABSTRACT

A flat resolver, which has a magnetic path forming a magnetic flux effectively linking to a secondary winding and a detection winding and has a uniform gap between a stator portion and a movable portion so that a resolver signal can be output with high precision, is provided. The flat resolver includes: plate portions of a stator core and a movable core, which are made of a magnetic material and are disposed in parallel with each other; a plurality of magnetic pole portions protruding from opposed surfaces of the plate portions; coil arranged-wiring substrates disposed around each of the magnetic pole portions; transformer winding cores disposed on the plate portions; and transformer winding arranged-wiring substrates disposed on the transformer winding cores.

9 Claims, 5 Drawing Sheets

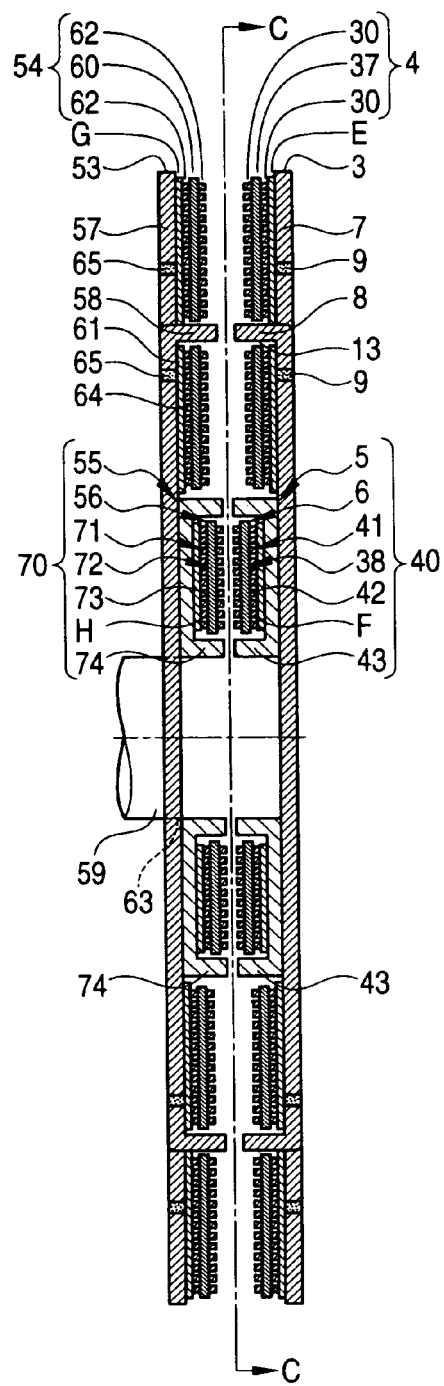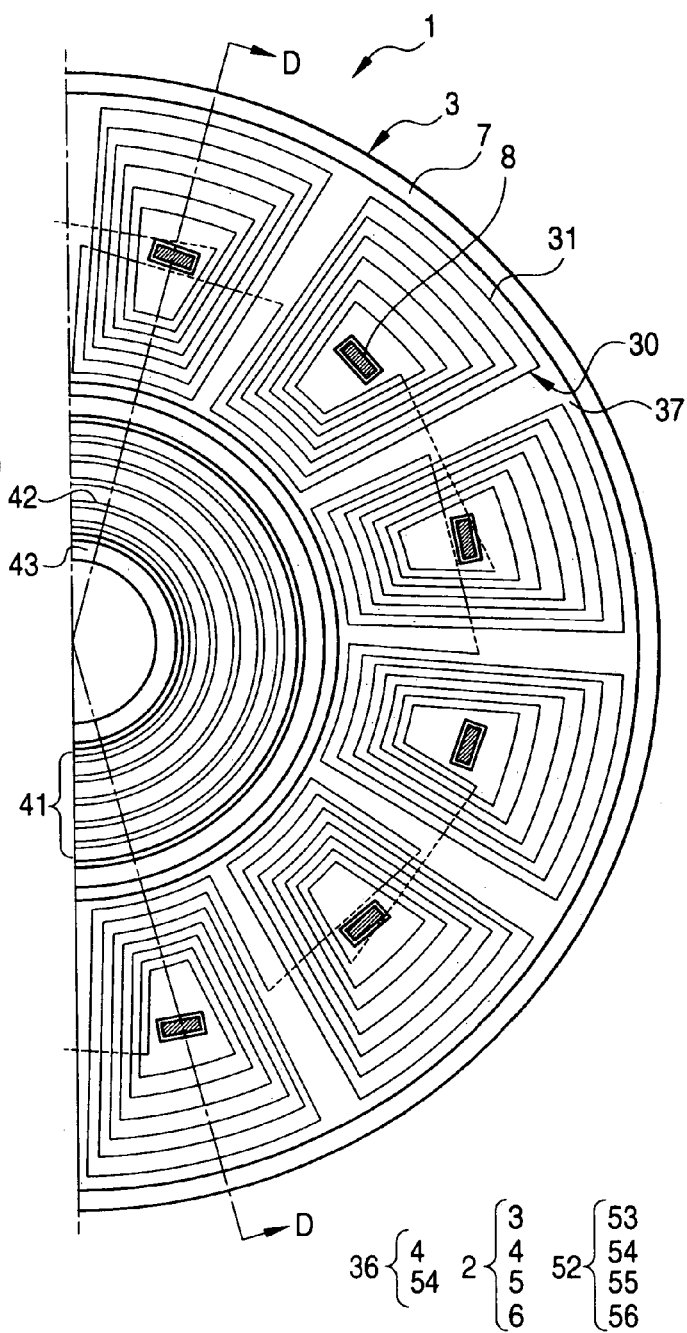

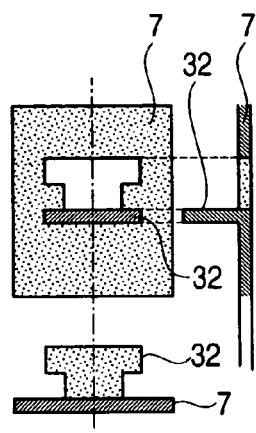
FIG. 3 (a)
FIG. 3 (b)
FIG. 3 (c)
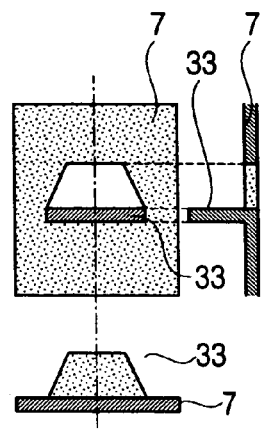
FIG. 4 (a)
FIG. 4 (b)
FIG. 4 (c)
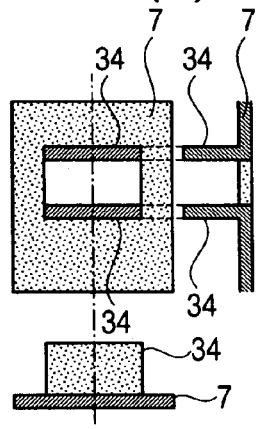
FIG. 5 (a)
FIG. 5 (b)
FIG. 5 (c)
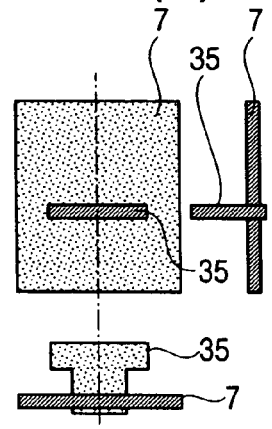
FIG. 6 (a)
FIG. 6 (b)
FIG. 6 (c)

FLAT RESOLVER

BACKGROUND OF THE INVENTION

1. Field of the Invention

The present invention relates to a resolver for detecting a rotational position, and more particularly, to a flat resolver having a transformer winding.

2. Description of the Related Art

A related art resolver having a transformer winding for supply of a power source is illustrated in FIG. 7.

FIG. 7 is a partially cross-sectional view of a related art resolver having a cylindrical stator assembly and a rotor assembly which is disposed coaxially with the cylindrical stator assembly.

In FIG. 7, a resolver 100 has a cylindrical stator assembly 101, a rotor assembly 102 disposed coaxially with the stator assembly 101, and a transformer portion 103 including an inner core 104 and an outer core 105 disposed coaxially with the inner core 104.

A stator portion includes the outer core 105 and the stator assembly 101, which are axially installed in a cylindrical housing 106.

A rotor portion includes the inner core 104 and the rotor assembly 102, which are axially installed around a shaft 107.

A winding of the inner core 104 of the transformer portion 103 is connected via a crossover wire to a rotor winding of the rotor assembly 102. The winding portions of the resolver are coaxially arranged. Therefore, in order to prevent the axis from being deviated from a center, two bearings 108 are axially arranged with a spacing.

In the example of FIG. 7, the inner core 104, the rotor assembly 102 and the two bearings 108 are axially disposed end to end. Therefore, the resolver has a large length in the axial direction. Therefore, the configuration of the stator assembly 101 and the rotor assembly 102, which are cylindrically arranged, and the configuration of the inner core portion and the outer core portion, which are cylindrically arranged, are complicated, so that the whole structure cannot be miniaturized.

To reduce the length in the axial direction, a disk-like resolver or a flat resolver has been proposed (see, for example, JP-A-08-136211 and JP-A-05-010779).

FIG. 8 is a cross-sectional view illustrating a related art flat resolver disclosed in JP-A-08-136211.

In FIG. 8, a stator portion has a stator core 111 and a stator sheet coil 113.

The stator core 111 includes a disk-like magnetic plate 112 of a material having good high frequency-core loss characteristics (e.g., ferrite, etc.).

The stator sheet coil 113 is fixed to a side surface of the magnetic plate 112 using an adhesive or the like. The stator sheet coil 113 is formed as follows. A primary winding 114 of a rotary transformer portion A and a detection winding 115 of a signal generation portion B are formed of a plate-like conductive material using a printed wiring technique, such as etching, printing or presswork. The primary winding 114 and the detection winding 115 are attached on top and bottom surfaces of a disk-like insulating substrate of polyimide. Further, the surface of the conductor material is subjected to an insulating treatment using polyimide resin or the like.

A rotator portion has a rotator core 116 and a rotator sheet coil 118. The rotator portion is fixed to a shaft 119. The rotator core 116 is in the shape of a disk and is opposed to the stator core 111 with a spacing therebetween. The rotator core 116 includes a magnetic plate 117 as does the stator core 111.

The rotator core 116 has a center portion which is fixed to a shaft 119, and therefore, is supported via a bearing 121 by a bracket 120 which is fixed to the stator core 111.

The rotator sheet coil 118 is fixed to a side of the magnetic plate 117 using an adhesive or the like. The rotator sheet coil 118 is formed as follows. A secondary winding 122 of the rotary transformer portion A and an excitation winding 123 of the signal generation portion B are similarly formed using the printed wiring technique. The secondary winding 122 and the excitation winding 123 are attached on top and bottom surfaces of a disk-like insulating substrate of polyimide. Further, the surface of the conductor material is subjected to an insulating treatment using polyimide resin or the like. Note that, when an adhesive is used to fix the stator core 111 and the rotator core 116 to the stator sheet coil 113 and the rotator sheet coil 118, respectively, the adhesive has a thickness of about 25 μm. Therefore, a magnetic gap is increased, leading to an increase in the power consumption. By adding soft magnetic powder (e.g., soft ferrite, etc.) to the adhesive, the relative permeability of the adhesive can be improved, so that the magnetic gap is reduced, leading to a decrease in the power consumption.

The related art flat resolver of FIG. 8 has the following problems.

(1) When the stator core 111 and the rotator core 116 are fixed to the stator sheet coil 113 and the rotator sheet coil 118, respectively, using an adhesive, the adhesive has a thickness of about 25 μm. Therefore, the stator sheet coil 113 may be mounted onto a surface of the stator core 111 with a tilt due to the thick adhesive layer or the rotator sheet coil 118 may be mounted onto a surface of the rotator core 116 with a tilt due to the thick adhesive layer. In this case, a gap between the stator and the rotator is not uniform, so that magnetic coupling between the stator and the rotator is distorted due to the tilt.

(2) The surface of the conductive material is subjected to the insulating treatment using polyimide resin or the like. Therefore, the gap between the stator and the rotator is not uniform due to the thickness of the resin layer on the conductive material, and the length in the axial direction between the stator and the rotator is increased. Therefore, magnetic coupling between the stator and the rotator is deteriorated.

(3) The primary winding 114 of the rotary transformer portion A and the detection winding 115 of the signal generation portion B are supported on the magnetic plate 112. The secondary winding 122 of the rotary transformer portion A and the excitation winding 123 of the signal generation portion B are supported on the magnetic plate 117. Only the magnetic plates 112 and 117 of the opposite sides form a magnetic path. The magnetic path is insufficient for formation of a magnetic flux effectively linking to the secondary winding 122 and the detection winding 115, so that leakage flux is significant.

The winding is formed of a plate-like conductive material using a printed wiring technique, such as etching, printing or presswork. Therefore, the number of turns in the winding cannot be large. It is difficult to obtain a large magnetic flux generated in the winding.

SUMMARY OF THE INVENTION

An object of an illustrative, non-limiting embodiment of the present invention is to provide a flat resolver which has a magnetic path which forms a magnetic flux effectively linking to a secondary winding and a detection winding and has a uniform gap between a stator portion and a movable portion so that a resolver signal can be output with high precision. Also, the present invention is not required to overcome the disadvantage described above, and an illustrative, non-limiting embodiment of the present invention may overcome a different disadvantage or may not overcome any disadvantages.

The present invention provides the following solving means.

(1) In a flat resolver, plate portions of a stator core and a movable core of a magnetic material (i.e., a plate portion of a magnetic material core in a stator assembly and a plate portion of a magnetic material core in a movable assembly) are disposed in parallel with each other, a plurality of magnetic pole portions protrude from each of opposed surfaces of the plate portions, a coil arranged-wiring substrate is provided on each of the magnetic pole portions, a transformer winding core is provided on each of the plate portions, and a transformer winding arranged-wiring substrate is provided on the transformer winding core.

(2) In the flat resolver of (1), the magnetic pole portions protruded from one of the opposed surfaces and the magnetic pole portions protruded from the other of the opposed surfaces are opposed to each other, and side wall portions of the transformer winding cores (i.e., a side wall portion of the transformer winding core in the stator assembly and a side wall portion of the transformer winding core in the movable assembly) are opposed to each other.

(3) In the flat resolver of (1) or (2), the wiring substrates are fixed to the respective cores in a manner that allows the wiring substrates to be detachable from the respective cores. That is, the coil arranged-wiring substrate is detachably fixed to the stator or movable core, and the transformer winding arranged-wiring substrate is detachably fixed to the transformer winding core.

(4) In the flat resolver of any one of (1) to (3), the coil arranged-wiring substrates are a detection coil arranged-wiring substrate having surfaces, a detection coil being arranged on each of the surfaces, and an excitation coil arranged-wiring substrate having surfaces, an excitation coil being arranged on each of the surfaces; and the transformer winding arranged-wiring substrates are a primary transformer winding arranged-wiring substrate having surfaces, a primary transformer winding being arranged on each of the surfaces, and a secondary transformer winding arranged-wiring substrate having surfaces, a secondary transformer winding being arranged on each of the surfaces.

(5) In the flat resolver of any one of (1) to (3), each of the coil arranged-wiring substrate and the transformer winding arranged-wiring substrate is a multilayer wiring substrate.

(6) In the flat resolver of any one of (1) to (5), the coil arranged-wiring substrate has an annular shape, annular coil patterns having different winding directions are provided on surfaces of the coil arranged-wiring substrate so that a pair of magnetic poles are provided on the surfaces, an opening is provided at a position corresponding to a center of each of the annular coil patterns of the coil arranged-wiring substrate, the magnetic pole is inserted into the opening, the transformer winding arranged-wiring substrate has an annular shape, and transformer windings are provided on surfaces of the transformer winding arranged-wiring substrate along the annular shape.

(7) In the flat resolver of any one of (1) to (6), the transformer winding core is integrated as a transformer winding core portion with the stator core or the movable core. That is, the transformer winding core in the stator assembly is integrated with the stator core, and the transformer winding core in the movable assembly is integrated with the movable core.

(8) In the flat resolver of any one of (1) to (7), the magnetic pole portion is constructed in a cut-and-bent shape on the plate portion.

(9) In the flat resolver of any one of (1) to (8), the core (the stator core or the movable core) includes a plate portion having a plurality of slits, and a plurality of magnetic pole portions spaced at an interval in an annular area of the plate portion, and the slits limit a magnetic path formation area of a magnetic flux passing through between a pair of the magnetic pole portions provided on the core.

(10) In the flat resolver of any one of (1) to (9), the number of coils of the coil arranged-wiring substrate provided on each of the stator core and the movable core is set depending on an N-fold axial angle.

According to the present invention, the cores have the magnetic pole portion and the side wall portion, thereby making it possible to provide a magnetic path which forms a magnetic flux effectively linking to the secondary winding and the detection winding. Therefore, it is possible to effectively convert a generated magnetic flux to an output, while reducing a leakage magnetic flux.

By providing the magnetic pole portion and the side wall portion in the cores, it is possible to obtain a uniform gap between the stator core and the movable core, thereby making it possible to output a high-precision resolver signal.

With the flat resolver structure, it is possible to reduce a length thereof in an axial direction.

The primary and secondary transformer winding arranged-wiring substrates for rotary transformers (primary and secondary) can be prepared separately from the detection coil arranged-wiring substrate and the excitation coil arranged-wiring substrate. Therefore, the coil pattern, the winding pattern, and the number of layers of each substrate can be changed. As a result, characteristics (e.g., a ratio of transformer, impedance, etc.) of the resolver can be arbitrarily changed. General versatility can be obtained.

The stator core, the movable core, and the primary and secondary transformer winding cores are made of silicon steel (magnetic material). Therefore, it is possible to obtain stable gaps between the stator core and the movable core and between the primary transformer winding core and the secondary transformer winding core, thereby making it possible to output a high-precision resolver signal.

By providing a slit in the stator core and the movable core, a magnetic path can be concentrated or limited to the magnetic pole portion and the wall side portion, thereby making it possible to suppress a leakage magnetic flux and an influence on the transformer winding.

BRIEF DESCRIPTION OF THE DRAWINGS

FIGS. 1(a) and 1(b) are structural diagrams illustrating a flat resolver of an illustrative, non-limiting embodiment of the present invention.

FIGS. 3 to 6 each is a structural diagram illustrating magnetic poles in a flat resolver of an illustrative, non-limiting embodiment of the present invention.

DETAILED DESCRIPTION OF THE EMBODIMENTS

Figure 2A:
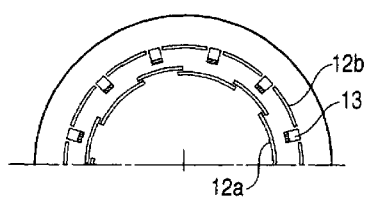
FIGS. 2(a) to 2(h) each is a structural diagram illustrating slits in a flat resolver of an illustrative, non-limiting embodiment of the present invention.

Hereinafter, exemplary embodiments of the present invention will be described in detail with reference to the accompanying drawings.

A flat resolver of an exemplary embodiment of the present invention includes a stator core, a movable core, and cores for a primary transformer winding and a secondary transformer winding (transformer winding cores), which are made of silicon steel (magnetic material), in such a configuration that magnetic poles of the stator and movable cores are opposed to each other, and magnetic poles of the primary and secondary transformer winding cores are opposed to each other.

A primary transformer winding arranged-wiring substrate and a secondary transformer winding arranged-wiring substrate for rotary transformers (movable transformers) are separated from a detection coil arranged-wiring substrate and an excitation coil arranged-wiring substrate so that the rotary transformer can be used as a common part. By changing the detection coil arranged-wiring substrate and the excitation coil arranged-wiring substrate, a resolver having a different N-fold axial angle (NX) is constructed.

The primary transformer winding arranged-wiring substrate and the secondary transformer winding arranged-wiring substrate for the rotary transformer, and the detection coil arranged-wiring substrate and the excitation coil arranged-wiring substrate are formed by a method in which a winding or a coil is formed using a wiring substrate, or alternatively, may be formed using a winding coil.

In the flat resolver, basically, plate portions of the stator core and the movable core made of a magnetic material are disposed in parallel with each other, a plurality of magnetic pole portions protrudes from opposed surfaces of the plate portions, a coil arranged-wiring substrate is provided on each of the magnetic pole portions, the transformer winding core is provided on each of the plate portions, and the transformer winding arranged-wiring substrate is provided on the transformer winding core. The detection coil arranged-wiring substrate and the excitation coil arranged-wiring substrate constitute the coil arranged-wiring substrate. The primary transformer winding arranged-wiring substrate and the secondary transformer winding arranged-wiring substrate constitute the transformer winding arranged-wiring substrate.

A plurality of slits are provided in the stator core and the movable core so that a magnetic magnetic path is formed in a limited area between a pair of the magnetic pole portions provided on the cores.

(Embodiment 1)

FIGS. 1(a) and 1(b) are structural diagrams illustrating a flat resolver of an exemplary embodiment of the present invention. Note that FIGS. 1(a) and 1(b) illustrates a half of the structure divided about a center axis thereof FIG. 1(a) is a plan view illustrating a divided-half structure of a stator portion, taken along line C—C of FIG. 1(b) which is a cross-sectional view thereof FIG. 1(b) illustrates a cross-section of the flat resolver of the present invention, taken along line D—D of FIG. 1(a).

The flat resolver 1 of FIGS. 1(a) and 1(b) is a resolver which has transformer windings and has 6 pairs of magnetic poles and a gap in an axial direction with wiring substrates formed in disk-like shape. The flat resolver 1 includes a stator assembly 2 and a movable assembly 52.

(Stator Assembly)

A stator assembly 2 includes a stator core 3, a detection coil arranged-wiring substrate 4, a primary transformer winding core 5, and a primary transformer winding arranged-wiring substrate 6.

The detection coil arranged-wiring substrate 4 is fixed to the stator core 3 using an adhesive layer E. The primary transformer winding arranged-wiring substrate 6 is fixed to the primary transformer winding core 5 using an adhesive layer F. Note that the adhesive can be one which allows the substrate to be detachable from the core.

The stator core 3 includes a plurality of slits 9, a plate portion 7 in the shape of a disk-like or an annular plate, and a plurality of magnetic pole portions 8 spaced at a interval in an annular area having a width which is defined with reference to a radius of the plate portion 7. The stator core 3 has a plate thickness of, for example, 0.2 to 0.35 mm.

The stator core 3 is formed from a magnetic material having less core loss, such as a silicon steel plate or the like.

FIGS. 2(a) to 2(h) each is a structural diagram illustrating the slit 9 of the present invention. The slit 9 includes an outer slit portion 10 provided on a radially outer circle and an inner slit portion 11 provided on a radially inner circle with the magnetic pole portion disposed therebetween.

In an example of FIG. 2(a), the inner slit portion 11 includes long arc slits 12a, in which adjacent slits are radially shifted in alternating directions, ends of the adjacent slits are at a distance from each other, and both the ends overlap when viewed in a radial direction. The outer slit portion 10 includes long arc slits 12b that are provided between the openings 13 cut for the magnetic poles.

Figure 2B:
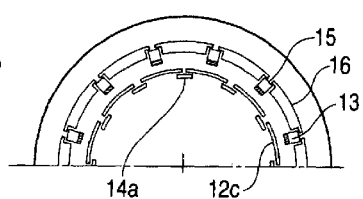

In an example of FIG. 2(b), the inner slit portion 11 includes long arc slits 12c spaced with a small gap on a circle, and short arc slits 14a disposed radially further inside than the long arc slits 12c, corresponding to the respective gaps between the long arc slits 12c. The outer slit portion 10 includes wide and long arc slits 16 that are provided between the openings 13 cut for magnetic poles and that has a step portion 15 disposed at a distance from the opening 13 in a radially outward direction.

Figure 2C:
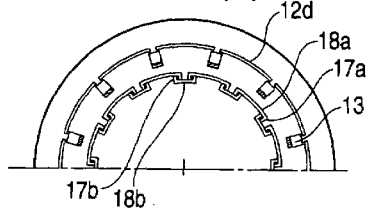

In an example of FIG. 2(c), the inner slit portion 11 includes substantially arc slits 18a having an inwardly bent portion 17a on each end thereof, and substantially arc slits 18b each have an outwardly bent portion 17b, corresponding to respective gaps between the substantially arc slits 18a. The outer slit portion 10 includes long arc slits 12d that are provided radially farther from a center than openings 13 cut for the magnetic poles and that has a small gap from the openings 13.

Figure 2D:
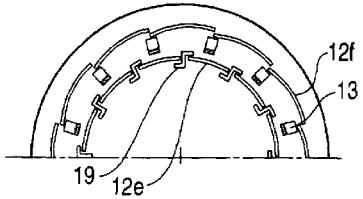

In an example of FIG. 2(d), the inner slit portion 11 includes long arc slits 12e and substantially S-shaped slits 19 provided between and separated from the long arc slits 12e. The outer slit portion 10 includes long arc slits 12f, and an end of one long arc slit 12f is provided below and separated from an end of its adjacent long arc slit 12f.

Figure 2E:
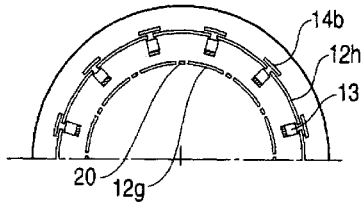

In an example of FIG. 2(e), the inner slit portion 11 includes long arc slits 12g and extremely short arc slits 20 which is provided between and separated from the long arc slits 12g. The outer slit portion 10 includes long arc slits 12h and short arc slits 14b that are provided, corresponding to respective gaps on a circle between the long arc slits 12g, and that are disposed radially farther from a center than the long arc slit 12h.

Figure 2F:
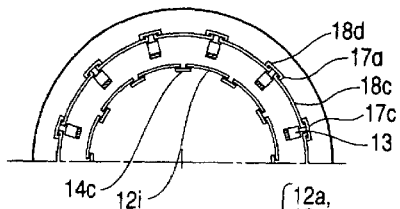

In an example of FIG. 2(f), the inner slit portion 11 includes long arc slits 12i and short arc slits 14c that are provided, corresponding to respective gaps on a circle between the long arc slits 12i, and disposed radially closer to a center than the long arc slit 12i. The outer slit portion 10 includes substantially arc slits 18c having an outwardly bent portion 17c on each end thereof, and substantially arc slits 18d each having an inwardly bent portion 17d, corresponding to respective gaps on a circle between the substantially arc slits 18c, and disposed radially farther from a center than the substantially arc slit 18c.

Figure 2G:
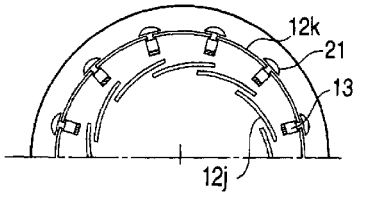

In an example of FIG. 2(g), the inner slit portion 11 includes long arc slits 12j, and an end of one long arc slit 12j is provided below and separated from an end of its adjacent long arc slit 12j. The outer slit portion 10 includes long arc slits 12k and deformed arc slits 21 that are provided, corresponding to respective gaps on a circle between the long arc slits 12k, and that are disposed radially farther from a center than the long arc slit 12k. The deformed arc slit 21 has a shape of a circular plate whose circumference is partially cut off with a straight line.

Figure 2H:
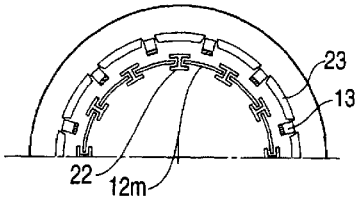
Figure 7:
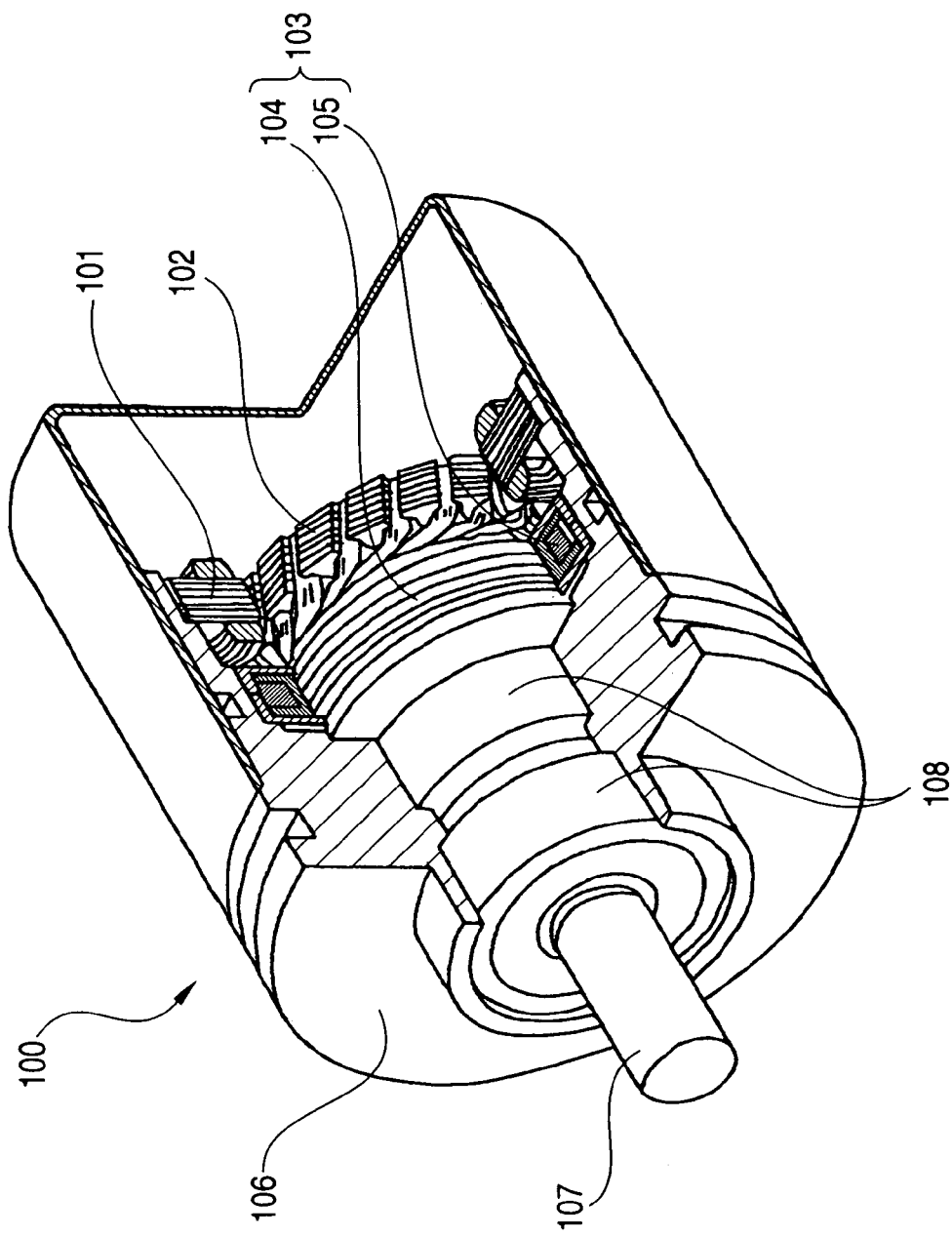
FIG. 7 is a partially cross-sectional view illustrating a resolver in the related art, which has a cylindrical stator assembly and a rotor assembly disposed coaxially with the cylindrical stator assembly.
Figure 8:
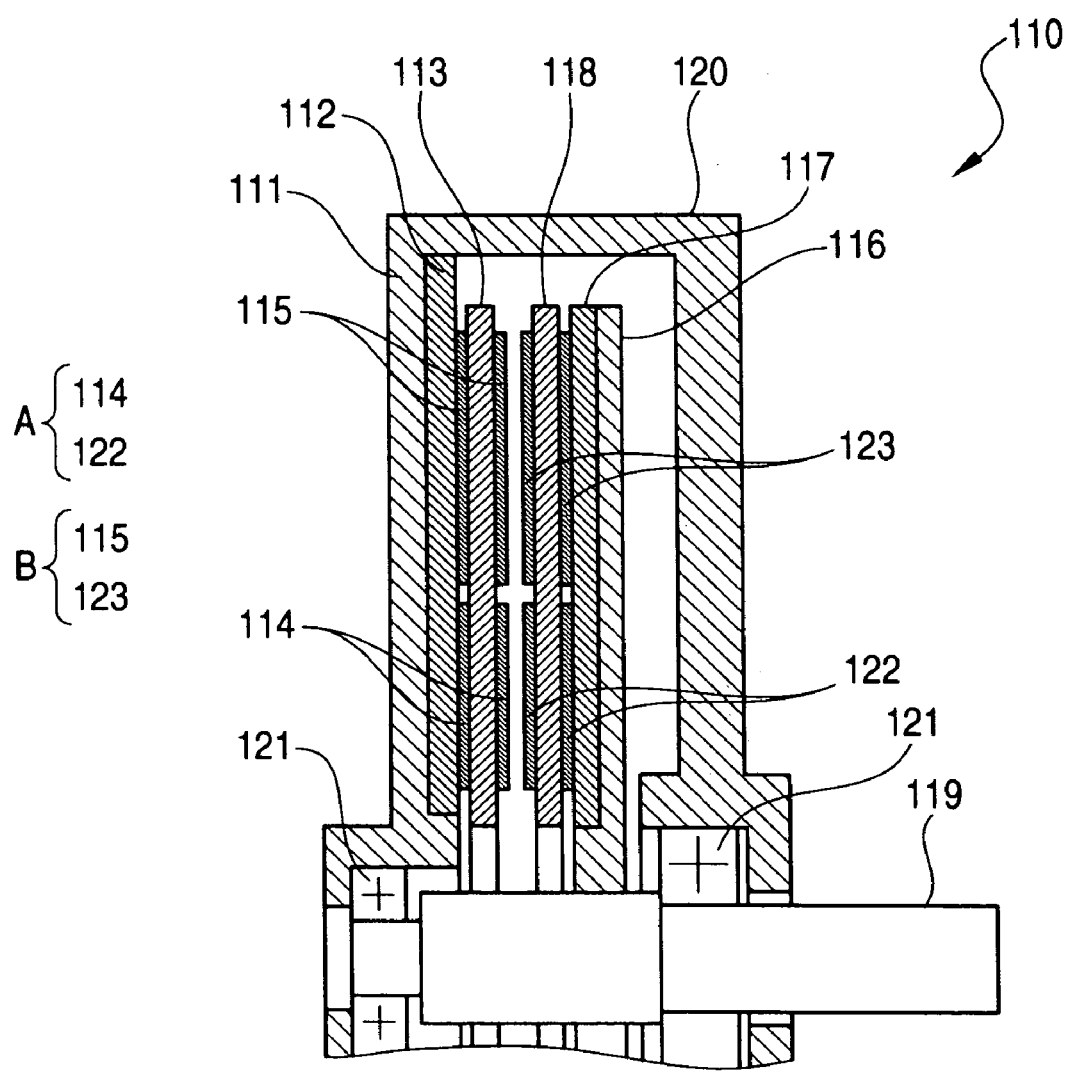
FIG. 8 is a cross-sectional view illustrating a flat resolver of JP-A-08-136211.

In an example of FIG. 2(h), the inner slit portion 11 includes long arc slits 12m and substantially H-shaped slits 22 that are provided between and separated from the long arc slits 12m. The outer slit portion 10 includes wide and long arc slits 23 having an end slanted surface, which are provided between and separated from the openings 13 cut for the magnetic poles, and which are provided radially farther from a center than the opening 13.

The slits 9 are formed at an interval in the above-described annular area of the plate portion by a punching process. The slit 9 is provided to limit an area in which a magnetic path is formed so that a magnetic flux passing through between a pair of magnetic pole portions (magnetic poles forming a closed magnetic path) provided on the stator core 3 is prevented from being deviated from an intended magnetic path or adversely affecting the transformer winding, i.e., the flux passes through the intended magnetic path. The slit 9 is in any arbitrary shape which can limit the magnetic path formation area.

The magnetic pole portion 8 is provided as a cut-and-bent magnetic pole in the plate portion 7 of FIG. 1(b). Alternatively, the magnetic pole portion 8 may be a single separate magnetic pole.

The magnetic pole portion 8 is formed by a cutting-and-bending means. Specifically, a plurality of cuts are created at an interval in an annular area having a width which is defined with reference to a radius of the plate portion 7. The plate portion 7 is bent up along the cut line to one side thereof The cut-and-bent positions correspond to center positions of the respective single coils 31 provided in the detection coil 30. The intervals of the cut-and-bent positions correspond to the intervals of the center positions of the single coils 31.

When the magnetic pole portion includes a core and a single separate magnetic pole portion 35, a magnetic pole portion 35 formed singly is provided in the opening provided in the plate portion 7 of the core by a fixing means, such as swaging, welding or the like. The opening corresponds to the position of the magnetic pole portion formed by the cutting-and-bending means.

FIGS. 3 to 6 each is a structural diagram illustrating various magnetic pole portions of an exemplary embodiment of the present invention. FIG. 3 is a structural diagram illustrating a T-shaped magnetic pole portion. FIG. 4 is a structural diagram illustrating a trapezoidal magnetic pole portion. FIG. 5 is a structural diagram illustrating a pair of plate-like magnetic pole portions. FIG. 6 is a structural diagram illustrating a single separate magnetic pole portion. These figures are used to describe exemplary magnetic pole portions on the stator portion. In each figure, (a) is a front view, (b) is a plan view, and (c) is a side view.

FIG. 3 illustrates an example of a T-shaped magnetic pole portion 32. The plate portion 7 is cut along sides of a T-shaped portion, leaving the bottom side thereof, and is bent up along the bottom side to create the T-shaped magnetic pole portion 32.

FIG. 4 illustrates an example of a trapezoidal magnetic pole portion 33. The plate portion 7 is cut along sides of a trapezoidal portion, leaving the bottom side of thereof, and is bent up along the bottom side to create the trapezoidal magnetic pole portion 33.

FIG. 5 illustrates an example of a pair of plate-like magnetic pole portions 34. The plate portion 7 is cut along the lines constituting a character H, leaving a pair of opposite parallel sides (included in the sides of two rectangles inside the character H). The two rectangles are bent up along the respective uncut sides to create the plate-like magnetic pole portions 34, which are opposed to each other.

In an example of FIG. 6, a single magnetic pole portion 35 having an arbitrary shape (e.g., T-shape) is previously prepared separately from the plate portion 7. A through hole corresponding to the magnetic pole portion 35 is formed in the plate portion 7, and the magnetic pole portion 35 is inserted into the through hole, followed by fixing by a fixing means, such as swaging, welding or the like.

The detection coil arranged-wiring substrate 4, which is included in the coil arranged-wiring substrate 36 of FIGS. 1(a) and 1(b), is formed by providing the detection coil 30 on top and bottom surfaces of an insulating substrate 37. The insulating substrate 37 may be formed only of insulating resin, or alternatively, may be formed by providing an insulating coat on a surface of a base material made of any arbitrary non-magnetic material.

The insulating substrate 37 is formed of an insulating resin material, such as polyimide or the like, in the shape of an annular disk. The detection coil 30 on the insulating substrate 37 is formed as printed wiring on a printed wiring substrate or wiring made of any arbitrary conductive material on an insulating substrate, such as printed wiring made of conductive coating, wiring made of metal foil, winding coil or the like. The detection coil 30 is optionally fixed to the insulating substrate 37 using an adhesive.

An area of the insulating substrate 37 corresponding to a center area of the detection coil 30 is provided with the opening 13 for inserting the cut-and-bent magnetic pole portion 8 on the stator core 3.

The detection coil 30 formed on one side of the insulating substrate 37 has a coil pattern which is a sine (sin) winding pattern, while the detection coil 30 formed on the other side of the insulating substrate 37 has a coil pattern which is a cosine (cos) winding pattern.

Note that the magnetic pole portions 8 on the stator core 3 are provided at centers of the respective coil patterns. Therefore, the sin winding pattern and the cos winding pattern have winding intervals and winding density which are adjusted so that the sin winding pattern and the cos winding pattern are linked to a magnetic flux generated by an excitation coil on the movable portion, and detection voltages having waveforms which have an electrical angle of 90° therebetween are generated. The coil patterns are formed about the respective magnetic pole portions 8 in a clockwise or counterclockwise direction, depending on a direction of a magnetic field to be generated (for formation of a magnetic pole pair or the like), and are formed in a two-dimensional manner.

Two adjacent magnetic pole portions (sometimes referred to as "a pair of magnetic poles" or "a magnetic pole pair" in the specification) in the stator core 3 are provided with coil patterns having opposite winding directions separately so that a closed magnetic path is constructed.

The detection coil 30 on the insulating substrate 37 is covered with a resin material to provide an insulating coat on the detection coil 30 and is fixed to the detection coil to the insulating substrate 37.

The number and pattern of magnetic pole pairs formed on the top and bottom surfaces of the insulating substrate 37 are determined based on required output characteristics. Basically, any arbitrary number and pattern of magnetic pole pairs can be used.

The detection coil arranged-wiring substrate 4 can be constructed as a multilayer wiring substrate in which a number of layers of detection coils 30 are arranged (or provided).

With such a multilayer wiring substrate, a capacitance, an inductance, and an impedance including a resistance thereof can be changed by changing the number of layers. Further, a ratio of transformer thereof can be changed.

The detection coil arranged-wiring substrate 4 is fixed to the stator core 3 using an adhesive layer E. The adhesive can be made of a material which allows the wiring substrate to be peeled off from the core, i.e., allows the wiring substrate to be detachable. When an adhesive which allows the wiring substrate to be detachable is used, wiring substrates having different characteristics can be selected and mounted. The detection coil 30 is connected to any arbitrary circuit, such as a signal processing circuit or the like (not illustrated).

(Primary Transformer)

A primary transformer 40 includes a planar and annular primary transformer winding core 5 having a U-shaped cross-section, and an annular primary transformer winding arranged-wiring substrate 6 on both sides of which a primary transformer winding pattern 41 including a primary transformer winding 42 is provided. The wiring substrate 6 is accommodated in an annular groove having a U-shaped cross-section of the primary transformer winding core 5 to be fixed to the primary transformer winding core 5 using an adhesive layer F. Both side wall portions 43 (excluding a bottom side) of the cross-sectional U-shape of the primary transformer winding core 5 protrude in a direction perpendicular to the plane portion 7 of the stator core 3 and are opposed to side wall portions 74 of a secondary transformer winding core 55 described below.

The annular primary transformer winding arranged-wiring substrate 6 having the primary transformer winding pattern 41 can be a multilayer wiring substrate. A fixing means can be an adhering means which allows the wiring substrate to be peeled off from the core, i.e., allows the wiring substrate to be detachable.

The primary transformer winding core 5 is fixed closer to a center than the detection coil arranged-wiring substrate 4 of the stator core 3. The primary transformer winding core 5 has a thickness of, for example, 0.2 to 0.35 mm.

The primary transformer winding pattern 41 is wound on an insulating substrate 38 in a manner that matches a shape of the annular groove having the U-shaped cross-section of the primary transformer winding core 5.

The primary transformer winding core 5 can have any arbitrary cross-sectional shape which allows the wiring substrate 6 to be accommodated, in addition to the U-shaped cross-section.

The primary transformer winding core 5 is formed of a magnetic material having less core loss, such as silicon steel or the like. The transformer winding core 5 is connected to a power source (not illustrated) directly or via a control circuit.

(Movable Assembly)

A movable assembly 52 includes a movable core 53, an excitation coil arranged-wiring substrate 54, a secondary transformer winding core 55, and a secondary transformer winding arranged-wiring substrate 56.

The excitation coil arranged-wiring substrate 54 is fixed to the movable core 53 using an adhesive layer G. The secondary transformer winding arranged-wiring substrate 56 is fixed to the secondary transformer winding core 55 using an adhesive layer H. The adhesive layers G and H can be made of an adhesive which allows the wiring substrate to be detachable as in the stator assembly.

The movable core 53 includes a plurality of slits 65, an annular disk-like plate portion 57, and a plurality of magnetic pole portions 58 spaced at an interval in an annular area having a width which is defined with reference to a radius of the plate portion 57, basically similar to the stator core 3. The movable core 53 has the same thickness and is formed of the same material as those of the stator core 3. An opening 63 for engaging and fixing a shaft 59 is formed closer to a center than the secondary transformer winding core 55 of the movable core 53.

The slits 65 are formed at an interval in an annular area having a width which is defined with reference to a radius of the plate portion 57, by a punching process, so that a function is obtained, as described above about the stator core 3. The slits 65 can be formed so as to have a structure of the examples shown in FIGS. 2(*a*) to 2(*h*).

The magnetic pole portions 58 are formed at positions in the annular area of the movable core 53 by cutting and bending as described above about the stator core 3. Also when provided as a separate magnetic pole plate, the magnetic pole portion 58 is formed as described above about the stator core 3.

The excitation coil arranged-wiring substrate 54, which is included in the coil arranged-wiring substrate 36, is formed by providing an excitation coil pattern 61 on top and bottom surfaces of an insulating substrate 60. The insulating substrate 60 is formed only of insulating resin, or alternatively, is formed by providing an insulating coat on a surface of a base material made of any arbitrary non-magnetic material as described above. The insulating substrate 60 can be a multilayer wiring substrate.

The excitation coil pattern 61 is provided with a coil-patterned conductive material which generates a sin output voltage signal in the sin winding pattern of the stator portion and a cos output voltage signal in the cos winding pattern of the stator portion, as the shaft 59 is rotated. Preferably, the excitation coil patterns 61 on both side surfaces of the insulating substrate 60 have the same coil pattern.

(Secondary Transformer)

A secondary transformer 70 includes a planar and annular secondary transformer winding core 55 having a U-shaped cross-section, and an annular secondary transformer winding arranged-wiring substrate 56 on both sides of which a secondary transformer winding pattern 71 is provided. The secondary transformer winding are arranged wiring substrate 56 is accommodated in an annular groove having a U-shaped cross-section of the secondary transformer winding core 55. The wiring substrate 56 is fixed to the secondary transformer winding core 55 using an adhesive layer H.

Both side wall portions 74 (excluding a bottom side) of the cross-sectional U-shape of the secondary transformer winding core 55 protrude in a direction perpendicular to the plane portion 57 of the movable core 53 and are opposed to side wall portions 43 of the primary transformer winding core 5 described above.

The annular secondary transformer winding arranged-wiring substrate 56 having the secondary transformer winding pattern 71 can be a multilayer wiring substrate. The secondary transformer winding core 55 has a similar structure to that of the primary transformer winding core 5 and is fixed closer to a center than the excitation coil arranged-wiring substrate 54 of the movable core 53. The secondary transformer winding core 55 has a thickness of, for example, 0.2 to 0.35 mm.

The secondary transformer winding pattern 71 is wound on an insulating substrate 72 in a manner that matches a shape of the annular groove having a U-shaped cross-section of the secondary transformer winding core 55.

The secondary transformer winding pattern 71 have a number of turns in the winding different from that of the primary transformer winding pattern 41.

A secondary transformer winding 73 is connected to an excitation coil 62 via a groove (not illustrated) or a through hole (not illustrated) which is provided in the secondary transformer winding core 55.

(Resolver Assembly)

The movable portion and the stator portion are assembled as illustrated in FIG. 1(b). The plate portion 57 of the movable core 53 and the plate portion 7 of the stator core 3 are disposed in parallel with each other and are spaced with a gap of 2.0 to 2.5 mm. A gap between tips of the magnetic pole portion 58 of the movable core 53 and the magnetic pole portion 8 of the stator core 3, which are opposed to each other, and a gap between tips of the side wall portion 43 of the primary transformer winding core 5 and the side wall portion 74 of the secondary transformer winding core 55, are 0.2 to 0.3 mm, for example. As used herein, the term "opposed" in relation to two members, indicates that the two members face each other when the two center axes thereof match.

The shaft 59 is engaged with the opening 63 at a center of the movable core 53. The shaft 59 is driven and rotated, while the stator portion is supported by a bearing (not illustrated), so that the movable portion is rotated.

A magnetic flux is generated in the primary transformer winding pattern 41 by the passage of electric current through the stator primary transformer winding 42. In this case, an induced voltage is generated in the secondary transformer winding pattern 71 in the rotating movable portion. The induced voltage is supplied to the excitation coil 62 including an excitation winding 64 of the movable portion. A magnetic flux generated in the excitation coil pattern 61 of the movable portion penetrates through the opposed magnetic pole portions 8 and 58 to generate an induced voltage in the detection coil 30 of the stator portion. The induced voltage is output as a detection voltage signal (a sin output voltage signal or a cos output voltage signal), which is used to detect to a rotational position of the shaft 59.

(Embodiment 2)

In Embodiment 1, the primary transformer winding core 5 and the secondary transformer winding core 55 of the transformer portion are prepared separately from the stator core 3 and the movable core 53, respectively. Since these cores are made of a magnetic material, the core portions of the transformer portion are integrated with the stator core 3 and the movable core 53 in Embodiment 2.

In this case, the core portion of the transformer portion has a side wall portion which is perpendicular to the plate portion of the stator core or the movable core. The side wall portion is obtained by cutting and bending a portion of the plate portion of the stator core or the movable core. Therefore, the cut-and-bent portion is not continuous as is different from the side wall portion.

By integrally forming the core portions of the transformer portions at portions of the stator core and the movable core, a process of forming a separate core portion of the transformer portion can be omitted. In addition, dimensional precision can be increased.

When the core portion of the transformer portion is provided separately from the stator core (or the movable core), both thicknesses of the core portion of the transformer portion and the stator core (or the movable core) and a thickness of the wiring substrate having the transformer winding pattern limit a height of the cut-and-bent magnetic pole portion and a height of the side wall portion. However, when the core portions of the transformer portions are integrally formed as portions of the stator core and the movable core, respectively, as in Embodiment 2, the above-described limitation is eliminated, i.e., the heights of all of the cut-and-bent magnetic pole portions can be caused to be uniform. As a result, a uniform gap between the magnetic poles of the stator core and the movable core can be easily obtained.

(Embodiment 3)

The number of magnetic pole pairs provided on the excitation coil arranged-wiring substrate and the number of magnetic pole pairs provided on the detection coil arranged-wiring substrate may be set so that N electrical output signal having one cycle (one cycle of sin output voltage signal) are output during one revolution of the shaft (mechanical angle: 360°). In this case, an N-fold axial angle (NX) can be achieved. The magnetic pole pairs can be changed by changing the excitation coil arranged-wiring substrate or the detection coil arranged-wiring substrate as appropriate.

Thus, characteristics of the resolver can be easily changed by selecting the various wiring substrates.

Similarly, the number of turns in the excitation coil or the detection coil can be changed so as to change characteristics of the resolver, by changing the various wiring substrates.

Similarly, by changing the various wiring substrates on which the transformer winding pattern is provided, the number of turns in the transformer winding pattern can be changed to change an output of the transformer.

While the present invention has been particularly shown and described with references to embodiment thereof, it will be understood by those skilled in the art that various changes in form and details may be made therein without departing from the spirit and scope of the invention as defined by the appended claims.

The present application claims foreign priority based on Japanese Patent Application No. JP2004-358929, filed on Dec. 10 of 2004, the contents of which is incorporated herein by reference.

What is claimed is:

1. A flat resolver comprising a stator assembly and a movable assembly, each comprising:
    a magnetic material core comprising:
        a plate portion; and
        a plurality of magnetic pole portions,
            wherein respective plate portions in the stator and movable assemblies are disposed in parallel with each other, and the plurality of magnetic pole portions protrude from a surface of the plate portion, the surface facing to the other assembly;
    a coil arranged-wiring substrate comprising:
        an annular shape;
        surfaces on each of which annular coil patterns having different winding directions is arranged so that a pair of magnetic poles are provided; and
        an opening at a position corresponding to a center of each of the annular coil patterns,
            wherein the magnetic pole is inserted into the opening, and
            wherein a coil is arranged around each of the magnetic pole portions;
    a transformer winding core disposed on the plate portion; and
    a transformer winding arranged-wiring substrate having an annular shape; surfaces on each of which a transformer winding is arranged along the annular shape; and disposed on the transformer winding core.

2. The flat resolver according to claim 1, wherein the magnetic pole portions of the stator assembly and the magnetic pole portions of the movable assembly are opposed to each other; the transformer winding core comprises a side wall portion; and the side wall portion in the stator assembly and the side wall portion in the movable assembly are opposed to each other.

3. The flat resolver according to claim 1, wherein the coil arranged-wiring substrate is fixed to the magnetic material core in a manner that allows the coil arranged-wiring substrate to be detachable from the magnetic material core, and the transformer winding arranged-wiring substrate is fixed to the transformer winding core in a manner that allows the transformer winding arranged-wiring substrate to be detachable from the transformer winding core.

4. The flat resolver according to claim 1, wherein the coil arranged-wiring substrate of the stator assembly is a detection coil arranged-wiring substrate having surfaces on each of which a detection coil is arranged; the coil arranged-wiring substrate of the movable assembly is an excitation coil arranged-wiring substrate having surfaces on each of which an excitation coil is arranged; the transformer winding arranged-wiring substrate of the stator assembly is a primary transformer winding arranged-wiring substrate having surfaces on each of which a primary transformer winding is arranged; and the transformer winding arranged-wiring substrate of the movable assembly is a secondary transformer winding arranged-wiring substrate having surfaces on each of which a secondary transformer winding is arranged.

5. The flat resolver according to claim 1, wherein each of the coil arranged-wiring substrate and the transformer winding arranged-wiring substrate is a multilayer wiring substrate.

6. The flat resolver according to claim 1, wherein the transformer winding core is integrated as a transformer winding core portion with the magnetic material core.

7. The flat resolver according to claim 1, wherein the magnetic pole portions are constructed in a cut-and-bent shape on the plate portion.

8. The flat resolver according to claim 1, wherein the plate portion has a plurality of slits, the plurality of magnetic pole portions are spaced at an interval in an annular area of the plate portion, and the slits limit a magnetic path-forming area of a magnetic flux passing through between a pair of the magnetic pole portions.

9. The flat resolver according to claim 1, wherein the number of coils arranged in the coil arranged wiring-substrate is set depending on an N-fold axial angle.

* * * * *